April 25, 1967 Z. VIGH 3,316,038
HIGH SPEED TURBO-ELECTRIC GENERATOR BEARING
Filed July 14, 1964 2 Sheets-Sheet 1
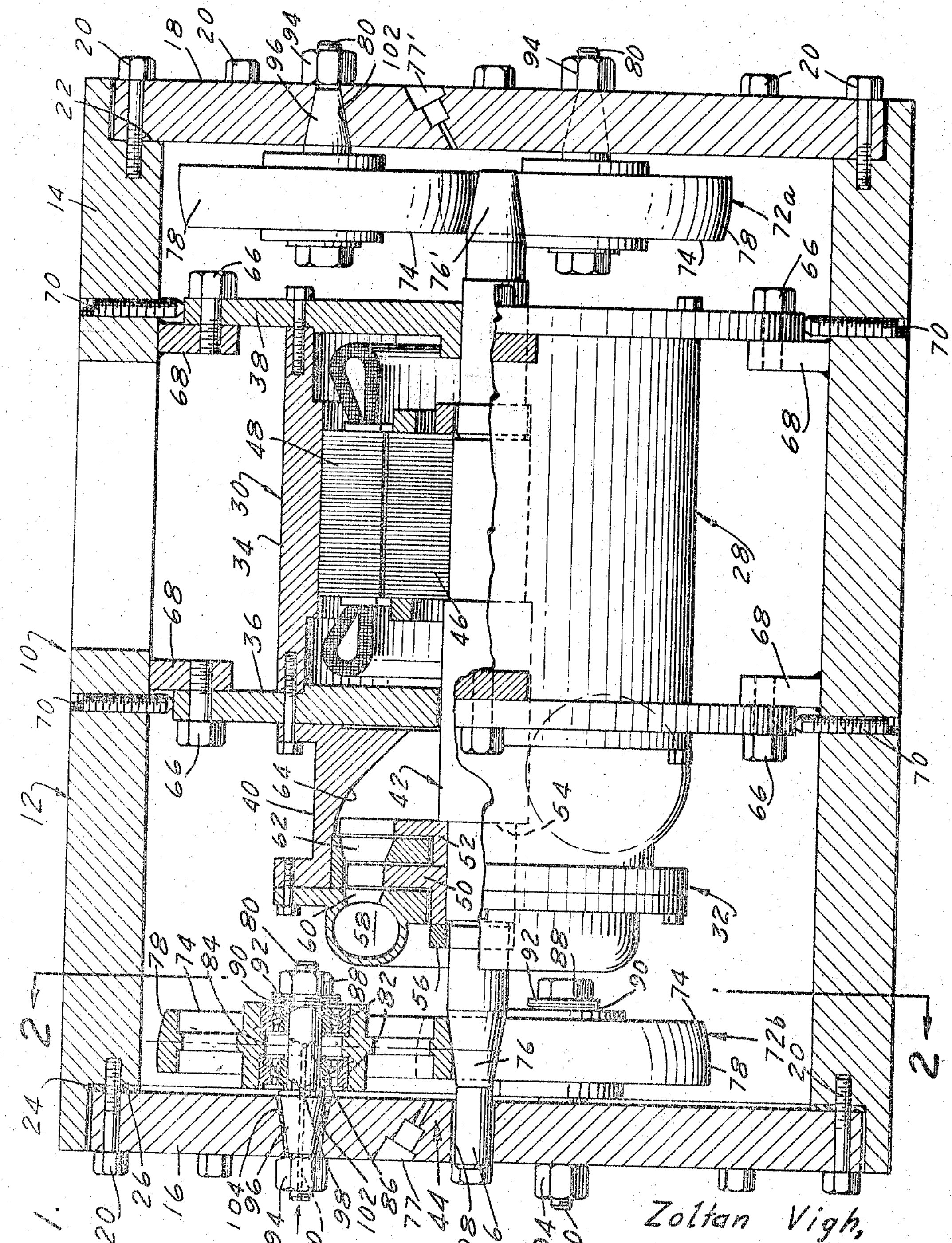
Zoltan Vigh,
INVENTOR.
BY Vernon D. Beehler
Attorney

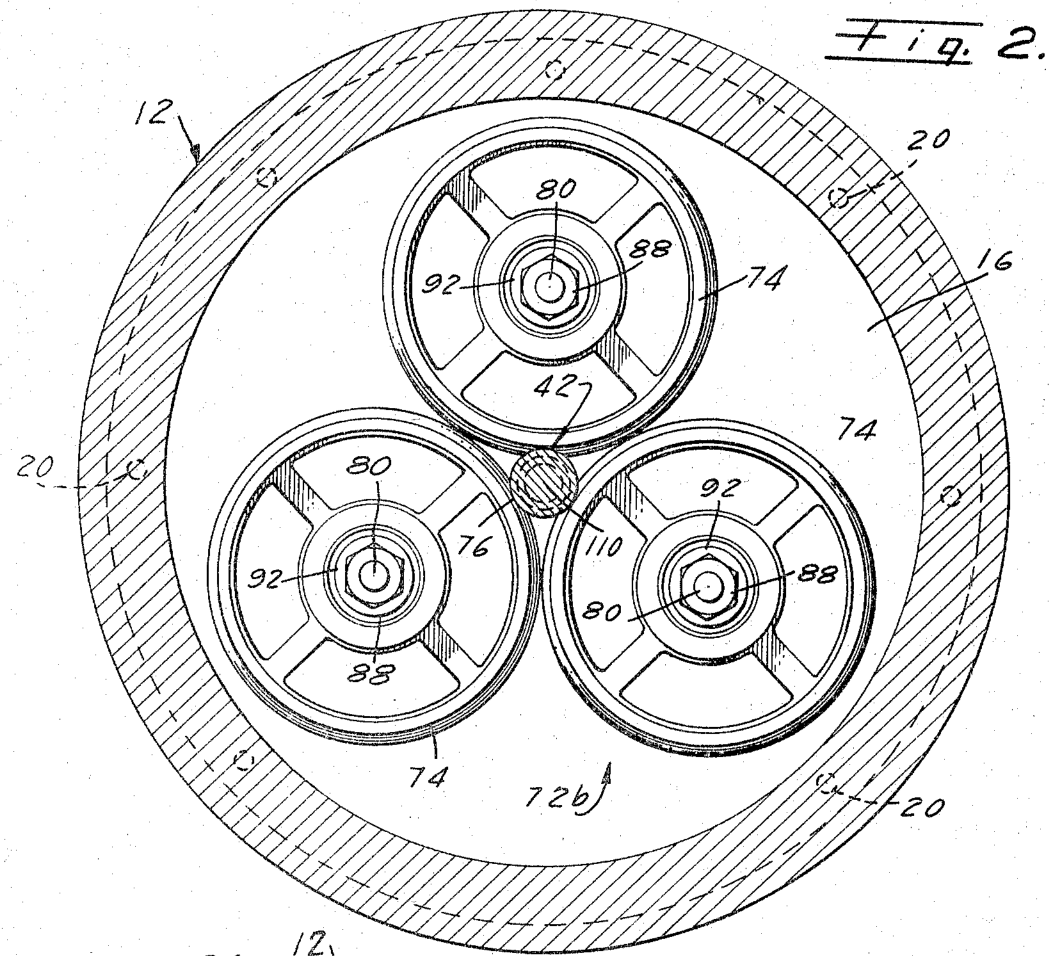
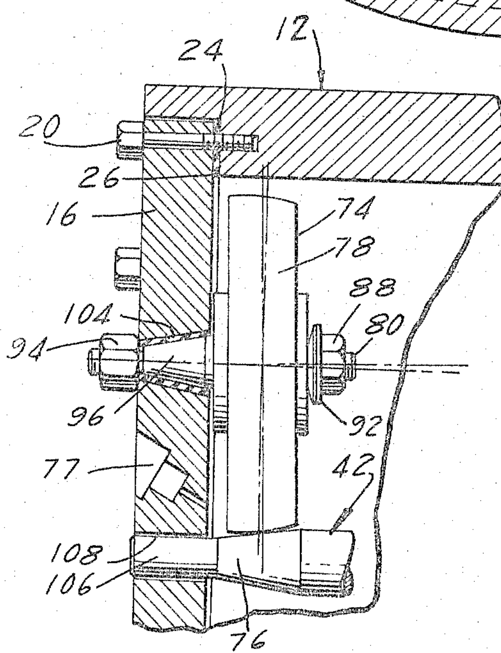
Fig. 3.
Zoltan Vigh,
INVENTOR.
BY Vernon D. Beehler
Attorney United States Patent Office 3,316,038

Patented Apr. 25, 1967

3,316,038

HIGH SPEED TURBO-ELECTRIC GENERATOR BEARING

Zoltan Vigh, 150 E. Highland, Apt. H, Sierra Madre, Calif. 91024

Filed July 14, 1964, Ser. No. 382,487
11 Claims. (Cl. 308—203)

This invention relates generally to anti-friction bearings and more particularly to improvements in roller bearing mounts for rotary shafts, particularly ultra-high speed rotary shafts.

Modern technical developments have resulted in the design of a wide variety of high speed and ultra-high speed rotary machines. It is not uncommon, for example, for modern turbo-machinery to attain speeds on the order of 100,000 to 300,000 r.p.m. and higher. One of the major problems involved in the design of such ultra-high speed machines is devising suitable bearings for rotatably supporting the rotary part, or shaft, of the machines.

Bearing design for ultra-high speed machines presents a multitude of difficult problems, many of which are not encountered in bearing design for relatively low speed machines. Moreover, each type of bearing poses its own unique design problems, some of which may dictate against use of a particular bearing, at least without modification, in ultra-high speed applications. Conventional roller bearings, for example, are ill-suited in ultra-high speed operation because of the extreme speeds at which the bearing rollers are required to rotate, the precision and accuracy with which the bearings must be manufactured and installed, the dynamic instabilities inherent in many roller bearings, and the lubrication problems involved.

One important aspect of this invention is concerned with overcoming the above and other problems involved in the design of roller bearings for ultra-high speed operation and providing an improved roller bearing mount capable of operating at ultra-high speeds, i.e., speeds on the order of 100,000 r.p.m. or greater. In this regard, unique and highly important features of the invention reside in the diameter of the bearing rollers relative to the diameter of the rotatably supported shaft, whereby bearing roller speed is greatly reduced, in the contour of the roller bearing surfaces, whereby precise alignment of the roller axes and the shaft axis is not essential, and in the manner in which the bearing rollers are rotatably supported, whereby excessive play in the bearings is eliminated.

In many, if not most rotary machines, the shaft must be axially restrained as well as radially supported for rotation. In other words, the shaft must be provided with both radial and thrust bearings. In some cases, separate thrust and radial bearings are used for this purpose. In other cases, combined thrust and radial bearings are employed. The problems involved in ultra-high speed bearing design are amplified when both radial and thrust supporting functions are demanded of the bearing; that is to say, when the bearing is required to serve as combined thrust and radial bearings. For example, a typical combined radial and thrust bearing mount for a rotary shaft consists of conical bearing surfaces on the shaft and bearing rollers engaging the conical bearing surfaces so as to support the shaft radially and in both axial directions. In this kind of bearing mount, an axial load on the shaft, or thermal expansion and contraction of the shaft, which occurs during shaft rotation, creates play or looseness in the mount, thereby permitting the shaft to vibrate. This precludes the use of a conventional bearing mount of this kind for ultra-high speed operation.

A further important aspect of this invention is concerner with eliminating the above and other deficiencies of existing cone-type, combined radial and thrust bearings and providing an improved cone-type radial and thrust bearing which is designed to accommodate slight aixal movement of the shaft, as well as thermal expansion and contraction of the shaft, without detrimentally affecting the radial and thrust supporting functions of the bearing support and without inducing shaft vibration. In this regard, an important feature of the invention resides in a unique resilient support for the bearing rollers of the bearing mount and in a unique peripheral contour of the bearing rollers, whereby the rollers are adapted to yield radially as the conical bearing surfaces on the shaft move back and forth as a result of endwise shaft movement and endwise thermal expansion and contraction of the shaft, while remaining in proper radial and thrust supporting relation to the shaft.

Another highly important feature of the invention resides in a means whereby one of the roller bearing supporting members may be adjusted to produce optimum preloading of the rollers, thereby to eliminate shaft vibration. The preload adjusting means is uniquely constructed to permit an initial preload in one bearing mount to be duplicated on other similar bearing mounts.

In the preceding discussion, the emphasis has been on the use of the present roller bearing mount at ultra-high shaft speeds. As the description proceeds, however, it will become apparent to those skilled in the art that the improved roller bearing mount is not limited to such ultra-high speed operation and may be used to advantage to rotatably support a shaft which turns at any speed.

It is a primary object of the present invention, therefore, to provide a new and improved roller bearing mount for rotary shafts, particularly rotary shafts which turn at high or ultra-high speeds.

Another object of the invention is to provide an improved roller bearing mount of the character described which provides combined radial and thrust bearing functions for supporting the shaft in both radial and axial directions.

Another object of the invention is to provide an improved roller bearing mount of the character described which is designed to accommodate limited axial movement as well as thermal expansion and contraction of the supported shaft without adversely affecting the radial and thrust supporting functions of the bearing, and without inducing shaft vibration.

A further object of the invention is to provide an improved roller bearing mount of the character described which may be adjusted to obtain optimum preloading of the bearing rollers, thereby to eliminate shaft vibration, and wherein the initial adjustment of one bearing mount may be quickly and easily duplicated in other similar bearing mounts.

Yet a further object of the invention is to provide an improved roller bearing mount of the character described which is relatively simple in construction, economical to manufacture, and otherwise ideally suited to its intended purposes.

Other objects, advantages, and features of the invention will become readily apparent as the description proceeds.

The objects of the invention are attained by providing a roller bearing mount in which at least one end of the rotary shaft is radially and axially supported by a relatively small number, i.e., three, of bearing rollers which are substantially larger in diameter than the shaft. These rollers engage a conical bearing surface on the shaft. The rollers are resiliently mounted on the housing or other stationary supporting structure of the mount in such manner that the rollers may yield radially relative to the shaft, thereby to accommodate limited axial movement as well as thermal expansion and contraction of the shaft. The resiliency of the bearing roller supporting means constantly retain the bearing rollers in proper radial and thrust supporting relation to the shaft. The peripheral bearing surfaces of the rollers are arcuately contoured, whereby the rollers remain in proper supporting engagement with the cone bearing surface of the shaft irrespective of the relative angular relationship of the bearing roller axes and the shaft axis.

Provision is made for axially adjusting the bearing rollers, thereby to permit optimum preloading of the rollers. This initial adjustment of one bearing mount may be quickly and easily duplicated in other, similar bearing mounts.

A better understanding of the invention may be had from the following detailed description of the presently preferred embodiment thereof, taken in connection with the attached drawings, wherein:

FIGURE 1 is an axial section through an ultra-high speed turbo-generator embodying an improved roller bearing mount according to the invention;

FIGURE 2 is a section taken on line 2—2 of FIGURE 1; and

FIGURE 3 is a detail of one of the bearing rollers in the roller bearing mount of FIGURES 1 and 2.

The turbo-generator 10 illustrated in these drawings comprises a housing 12 including a cylindrical body 14 and end plates 16 and 18 secured to opposite ends of the body by bolts 20. Each end of the body 14 is recessed to receive the respective end plate, as shown. The right-hand end plate 18 seats directly against the annular shoulder 22 formed by the right-hand recess in the body 14. The inner surface of the end plate 18 is ground to accurately locate the plate relative to the axis of the housing. A resilient gasket 24 is placed between the inner surface of the left-hand end plate 16 and the shoulder 26 defined by the body recess in which the end plate fits. The purpose of this gasket, which constitutes a highly important feature of the invention, will be explained presently.

Within the housing 12 is a turbo-generating unit 28 including an electrical generator 30 and a turbine 32 for driving the generator. The generator 30 includes a cylindrical housing 34 which is located between and bolted to a pair of circular end plates 36 and 38. Turbine 32 includes a cylindrical housing 40 which seats against and is bolted to the end plate 36.

Extending through the generator housing 34, the generator end plates 36 and 38, and the turbine housing 40 is a shaft 42. Shaft 42 is radially and axially supported at its ends by the improved roller bearing mount 44 of this invention, as will be explained shortly. The rotor 46 of generator 30 is fixed to the shaft 42. The stator 48 of the generator is fixed to the generator housing 34. Turbine 32 includes a pair of turbine wheels 50 and 52 which are keyed against rotation on the shaft 42 and confined axially between a shoulder 54 and a collar 56 on the shaft. Pressure fluid for operating the turbine 32 is delivered to the turbine inlet scroll 58 from a fluid pressure supply, not shown. The fluid flows axially from the scroll 58 through a first set of stationary turbine vanes 60, then through the vanes of the turbine wheel 50, a second set of turbine vanes 62, the vanes of the second turbine wheel 52, and finally into the turbine exhaust passage 64 which leads to the exterior of the turbo-generator housing 12. The turbine wheels 50 and 52, and hence the shaft 42, are thereby driven in rotation.

The turbo-generating unit 28 is mounted in the housing 12 by means of four mounting bolts 66 which extend through apertures in the generator end plates 36 and 38 and are threaded in lugs 68 welded or otherwise rigidly secured to the inner surface of the housing 12. Threaded in the housing 12 in the plane of each end plate 36 and 38 are a group of set screws 70. The set screws of each group are uniformly spaced about the housing 12 and the set screws of the two groups are preferably aligned axially of the housing. The inner ends of the set screws seat against the outer edges of the respective generator end plates 36 and 38. As will be explained shortly, the set screws 70 are provided to adjust and center the turbo-generating unit 28 relative to the rotor bearing mount 44.

The roller bearing mount 44 of this invention will now be described. This bearing mount comprises two sets **72*a* and 72*b* of bearing rollers 74 situated at opposite ends of the shaft 42. Each roller set 72*a* and 72*b* includes three bearing rollers 74 which are uniformly spaced about the shaft 42 and have a diameter many times the diameter of the shaft, as may be best observed in FIGURE 2. The rollers of each roller set peripherally engage conical bearing surfaces 76 and 76′ on the shaft 42. For reasons which will appear presently, the peripheral shaft engaging surface 78 of each bearing roller 74 is convexly curved in axial section. In the device herein described the rollers 72*a* and 72*b* are precision machined, as are also the bearing surfaces 76, 76′**. Out-of-round configuration and eccentricity of the parts must be kept to a scarcely measurable minimum.

Each bearing roller 74 is rotatably supported on a shaft 80 by means of a pair of angular contact ball bearings 82. These ball bearings fit within a central coaxial opening in the respective bearing roller 74 and are axially spaced by an intervening rib 84 on the respective roller against which the outer races of the ball bearing seat. The inner races of the ball bearings fit on a smooth cylindrical portion 86 of the respective roller shaft. One end of each roller shaft is threaded to receive a nut 88. Between the nut 88 and the adjacent ball bearing 82 is a conical or Belleville spring washer 90 backed up by a flat washer 92. The inner edge of the Belleville washer 90 seats against the inner race of the adjacent ball bearing 82. The opposite end of each roller shaft 80 is threaded to receive a nut 94 and is radially enlarged and conically tapered inwardly of the latter shaft end to form on the shaft a conical shoulder 96. This conical shoulder defines an axially facing shoulder surface 98 which seats against the inner race of the adjacent ball bearing 82. The foregoing description applies to all of the bearing rollers 84.

At this point, therefore, it is evident that when the nut 88 on each of the bearing roller shafts is tightened, the respective Belleville washer 90 is compressed between the nut and the inner race of the adjacent ball bearing 82, thereby creating an axial thrust on the latter race. This axial thrust is transmitted through the balls of the respective ball bearing to its outer race, then through the respective bearing roller shoulder 84 to the outer race of the other ball bearing 82, then through the balls of the latter ball bearing to its inner race, and finally to the shoulder 98 on the respective roller shaft. It is apparent, therefore, that tightening the nut 88 on each bearing roller shaft 80 has the effect of removing looseness or play in the respective ball bearings 82, thereby minimizing or eliminating any wobble motion in the respective bearing roller 74. In other words, the spring washer provides a yieldable preloading, an axial and radial clearance is eliminated, but limited axial and radial movement is possible.

Because of the lateral thrust which is exerted on the balls of each roller bearing 82, the latter must be force lubricated. To this end, each roller bearing shaft 80 contains an axial lubricant passage 100. One end of this passage opens radially to the respective ball bearings 82. The opposite end of the lubricant passage opens axially through the outer end of the respective roller shaft for connection to a source (not shown) of lubricant under pressure. The main shaft conical bearing surfaces 76 are lubricated by jet lubrication provided at jet lubrication fittings 77 and 77′.

The right-hand end plate 18 of the turbo-generating housing 12 is provided with tapered bores 102 for receiving the conical shoulder 96 of each bearing roller shaft 80 in the right-hand bearing roller set **72*a*** of FIGURE 1.

When installing the bearing rollers 74 of the bearing roller set 72*a*, the roller shafts 80 are inserted into the tapered bores 102 after which the shaft nuts 94 are drawn up tightly to rigidly secure the shafts to the housing end plate 18. The conical shoulders 96 on the roller shafts 80 of the left-hand roller set 72*b* of FIGURE 1 also fit within tapered bores 102 in the left-hand end plate 16 of the housing 12. The conical shoulder 96 of each roller shaft in the left-hand roller set 72*b*, however, is surrounded by a conical, elastic bushing 104. The bushings 104 and the gasket 24 may be made of the same elastic material, such as rubber. When installing the bearing rollers 74 in the left-hand bearing roller set 72*b*, the nuts 94 on the shafts 80 of the latter rollers are drawn up snug so as to produce slight compression of the elastic bushings 104. These bushings are capable of yielding to permit limited lateral deflection of the left-hand bearing rollers 74 toward and away from the shaft 42.

The left-hand end of the shaft 42, as viewed in FIGURE 1, has a reduced, cylindrical journal 106 which fits within a slightly enlarged bore 108 in the housing end plate 16. This is useful chiefly in making initial experimental runs, and once dimensions and preloading valves have been established, the journal 106 may be dispensed with.

The several bearing rollers 74 are preferably of the same diameter. As shown best in FIGURE 2, the rollers 74 of the roller set 72*b* are uniformly spaced about and equally radially spaced from the axis 110 of the turbo-generator housing 12. The rollers of the other roller sets 72*a* are similarly arranged. The diameter of the bearing rollers 74 and the axial spacing between the two roller sets 72*a* and 72*b* relative to the axial spacing between the conical bearing surfaces 76 of the shaft 42 are such that each conical bearing surface 76 fits between the bearing rollers 74 of its respective bearing roller set 72*a* or 72*b*, as the case may be, and the bearing rollers of each set engage the respective conical bearing surface approximately midway between the ends of the journals. Since the peripheral, shaft-engaging surfaces 78 of the bearing rollers 74 are convexly curved in axial section, as explained earlier and illustrated in FIGURE 1, each bearing roller has substantially point contact with its respective conical bearing surface.

From this description it is apparent that the two sets 72*a* and 72*b* serve as combined radial and thrust bearings which rotatably support the shaft 42 for turning approximately on the central axis 110 of the turbo-generator housing 12 and restrain the shaft against axial movement in the housing. As will be explained shortly, however, some slight axial movement of the supported shaft 42 does occur, and it is this slight axial movement which the present improved bearing mount 44 is designed to accommodate.

In operation of the turbo-generator 12, operating fluid under high pressure is delivered to the turbine 32 to drive the shaft 42 in rotation. The rotor 46 of the electrical generator 30 rotates with the shaft, whereby the generator produces an electrical output.

The turbo-generator 12 is designed to operate at ultra-high speeds. For example, the shaft 42 of a typical turbo-generator of the type illustrated in the drawings may attain speeds on the order of 100,000 r.p.m. or more. As is well known in the art, shaft vibration at these ultra-high speeds is a serious problem, and if such shaft vibration is not prevented, the maximum shaft speed will be drastically limited; or, if the maximum safe speed is exceeded, the unit will be severely damaged. The present improved roller bearing mount 44 is designed to prevent such shaft vibration, even at ultra-high speeds on the order of those mentioned above.

When initially preparing the turbo-generator 10 for operation, the first step is to accurately align the turbo-generator shaft 42 in the housing 12. This is accomplished by slightly loosening the mounting screws 66 for the turbo-generating unit 28 and then angularly and laterally adjusting the unit, by adjustment of the set screw 70, until the axis of the shaft 42 is centered between the bearing rollers 74. When the shaft 42 is finally aligned, the mounting bolts 66 are retightened to rigidly retain the unit 28 in its aligned position. In this aligned position, the shaft 42 is radially and axially supported by the bearing rollers 74 of the two bearing roller sets 72*a* and 72*b* and the reduced shaft journal 106 at the left-hand end of the shaft in FIGURE 1 is centered in and spaced slightly from the wall of the enlarged end plate bore 108.

Assume now that operating fluid is supplied to the turbine 32 for driving the shaft 42 in rotation. It is apparent from FIGURE 1 that this fluid, upon flowing through the vanes of the turbine wheels 50 and 52, creates a right-hand thrust on the shaft 42, which tends to move the latter bodily away from the left-hand roller set 72*b* and toward the right-hand roller set 72*a*. This right-hand thrust on the shaft 42 forces the right-hand bearing surface 76 of the shaft between the bearing rollers 74 of the roller set 72*a*, thereby causing the latter rollers to be spread slightly. Such spreading of the rollers, of course, is minimized owing to the fact that the looseness or play in the ball bearings 82 of the rollers is removed by tightening the shaft nuts 88, in the manner explained earlier. However, some spreading of the right-hand bearing roller 74 still occurs as a result of flexing of the Belleville washers 90, and lateral deflection or bending of the roller shafts 80. This right-hand movement of the shaft 42 tends to withdraw the left-hand bearing surface 76 of the shaft from between the bearing rollers 74 of the left-hand bearing roller set 72*b*.

In addition to such right-hand movement of the shaft 42, however, the latter undergoes axial thermal expansion owing to the temperature rise which occurs in the shaft as a result of heat transfer to the shaft from the operating fluid for the turbine 32 and from the generator 30. This thermal expansion of the shaft tends to thrust the left-hand shaft bearing surface to the left between the bearing rollers 74 of the left-hand bearing roller set 72*b*. Thus, when the turbine 32 is started up, the left-hand shaft bearing surface 76 initially moves slightly to the right, as viewed in FIGURE 1, relative to its respective bearing rollers 74, due to the right-hand axial thrust of the turbine operating fluid on the turbine wheels 50, 52. Thereafter the left-hand bearing surface 76 moves to the left relative to its bearing rollers 74, due to thermal expansion of the shaft 42. When the turbo-generator stops, reverse relative movements occur.

If the bearing rollers 74 of the bearing roller set 72*b* were rigidly mounted like the bearing rollers of the bearing roller set 72*a*, right-hand axial motion of the left-hand bearing surface 76 would create excessive clearance between the surface and the respective bearing rollers 74, thereby allowing the shaft 42 to vibrate. Subsequent thermal expansion of the shaft, on the other hand, would create excessive contact pressure between the bearing rollers and the shaft. In either event, the roller bearing mount 44 and/or other elements of the turbo-generator 10 would likely incur damage, particularly at ultra-high shaft speeds.

The present invention eliminates the possibility of excessive clearance and excessive contact pressure in the bearing mount 44, and thereby the danger of damage to the bearings and other parts of the turbo-generator occasioned, particularly at ultra-high speeds, by providing the resilient gasket 24 for the left-hand end plate 16 of the turbo-generator housing 12 and the resilient bushings 104 for the roller shafts 80 of the left-hand roller set 72*b*. It is evident that these resilient bushings are effective to accommodate limited lateral elastic yielding or deflection of the bearing rollers 74 in the roller set 72*b* toward and away from the shaft 42. Thus, the left-hand bearing rollers are capable of elastically yielding toward and away from the shaft 42, to accommodate the relative axial motion of the left-hand shaft bearing surface 76 which occurs during operation of the turbo-generator 10, while remaining in effective supporting engagement with the shaft 42. As a result, such relative axial motion creates neither excessive clearance nor excessive contact pressure in the bearing mount 44.

In order to assure proper initial contact pressure between the bearing rollers 74 of the roller bearing mount 44 and the shaft, it is necessary to adjust the bearing mount 44, while at room temperature, to preload the bearing rollers 74; that is to say, to establish an initial predetermined contact pressure of the rollers against the shaft bearing surfaces 76. This is accomplished by adjusting the mounting bolts 20 for the left-hand end plate 16 to attain the desired preload, which will result in subsequent vibration-less rotation of the shaft 42. The proper preload is determined by a process of trial and error. This adjustment of the end plate 16 is accommodated by the resilient gasket 24 which expands and compresses as the end plate is adjusted. The proper preload for a typical roller bearing mount according to the invention is on the order of 30 to 50 pounds, total axial load.

A unique and highly important feature of the invention resides in the fact that the bearing preload is related to the elasticity of the roller shaft bushings 104 and to the axial position of the end plate 16 relative to the end face of the turbo-generator housing 12. Accordingly, if a group of turbo-generators of the character illustrated in the drawings are constructed with the requisite degree of precision, it is only necessary to follow the preloading procedure outlined above for only one unit. The bearing preload may then be reproduced in the remaining units by simply measuring the position of the end plate 16 relative to the end face of the housing 12 and reproducing such relative end plate position in the remaining units.

A second unique and highly important feature of the invention resides in the convex, arcuate surfaces 78 of the bearing rollers 74. It is apparent that as the bearing rollers of each of the roller sets **72*a* and 72*b* flex laterally toward and away from the shaft 42, in the manner explained above, the angle between the axis of each bearing roller and the axis of the shaft changes slightly; that is to say, each bearing roller is canted slightly with respect to the shaft. Because of the curvature of the roller surfaces 78, each bearing roller 74 remains in proper bearing contact with its respective shaft bearing surface 76 irrespective of the angle between the axis of the respective bearing roller and the axis of the shaft 42. This is readily evident from FIGURE 3 which illustrates one of the bearing rollers 74 canted slightly relative to the shaft. If the roller surfaces 78 were strictly conically tapered, even slight angular displacement of a bearing roller 74 from a position in which the roller axis was exactly parallel to the axis of the shaft 42 would rock the conical roller surface to a position in which an edge of the roller would ride on the respective shaft surface 76. Rapid wear would thus occur in the bearing mount 44. This problem is obviously avoided in the illustrated bearing mount 44 wherein the roller surfaces 78 are convexly curved; since the roller surfaces remain in effective bearing contact with the shaft bearing surfaces 76 regardless of the angle between the roller axis and the shaft axis, the bearing rollers 74, being substantially larger in diameter than the shaft 42, obviously rotate at a speed which is substantially less than the speed of the shaft. In a typical roller bearing mount according to the invention, the ratio of diameters of the bearing rollers and shaft is on the order of 6.25 to 1. As a result, the speed of rotation of the bearing rollers 74 does not impose any restriction upon the speed of rotation of the shaft 42**.

It is obvious that the rotating mass of the turbo-generator 12 including the shaft 42, must be statically and dynamically balanced. Under certain conditions, as when initially adjusting the bearing mount 44 in the manner described above, it may be desirable to measure the rate of rotation of the shaft 42. The reduced shaft journal 106 in the surrounding wall of the bore 108 provides access to the shaft to perform the necessary measurement. As already noted, and as readily evident from FIGURE 1, the diameter of the bore 108 is somewhat larger than the diameter of the journal 106 so that during normal operation of the roller bearing mount 44, the shaft journal 106 turns freely in the bore 108 without contacting the wall of the bore.

Additional advantages of the present bearing mount reside in the fact that the resiliency in the left-hand bearing roller set **72*b* automatically compensates for machining errors and varying coefficients of thermal expansion in different units. The present improved bearing mount may be used to advantage, of course, in rotary machines other than the illustrated turbo-generator. For example, the sets of bearings 72*a* and 72*b*** may be mounted in housings separate and outside of an appropriate housing for the turbine and generator, thereby to minimize the seal and lubrication problem. If preferred further, the turbine and the generator may be mounted each on its own section of the shaft and the shaft supporters and rollers preloaded in the manner previously disclosed. In the last suggested form an intermediate set of rollers may be used to support a portion of the shaft at a location between the turbine and the generator. In this form the bearing surfaces at the ends of the shaft may be cylindrical and only the intermediate bearing surface conical.

It is apparent, therefore, that the invention herein described and illustrated is fully capable of obtaining the several objects and advantages preliminarily set forth.

While a presently preferred embodiment of the invention has been disclosed by way of illustration, various modifications in the design, arrangement of parts and instrumentalities of the invention are possible within the spirit and scope of the following claims:

I claim:

1. In combination: a support, a main shaft having an outwardly facing conical bearing surface at each opposite end, a set of bearing at each end, each set comprising a plurality of bearing shafts each having a supported end mounted on the support in initially substantially parallel relationship with said main shaft and having an unsupported end, each said bearing shaft having an idler bearing roller on the unsupported end, said bearing rollers being spaced about and peripherally engaging said main shaft to rotatably support the latter, resilient means mounting the supported end only of each of the bearing shafts of one of said sets in non-rotatable position on said support for rotation of each roller about an axis generally parallel to said main shaft, said means being angularly yieldable to enable said bearing shafts and the rollers thereon to deflect angularly uniformly toward and away from said main shaft, the peripheral shaft-engaging surface of each roller of both of said sets being convexly curved in axial section, whereby said roller surfaces remain in effective bearing contact with said shaft irrespective of the angle between the axis of each roller and the axis of said shaft.

2. The subject matter of claim 1 wherein portions of the support on which said bearing shafts are mounted are located endwardly outward relative to the respective conical bearing surface and the unsupported ends of said bearing shafts face inwardly toward said main shaft.

3. The subject matter of claim 1 wherein: the diameter of each of said rollers being not less than six times the diameter of the first identified shaft at the engagement of the shaft engaging surfaces.

4. In combination, a shaft having a conical bearing surface, a support, means supporting said shaft for rotation and against axial movement on said support including a plurality of bearing rollers spaced about and peripherally engaging said shaft bearing surface, and means rotatably mounting said rollers on said support for rotation of each roller about an axis and resilient lateral deflection of each roller toward and away from the shaft, and means for relatively axially adjusting said shaft and bearing rollers to preload the latter.

5. The subject matter of claim 1 wherein: the peripheral shaft-engaging surfaces of said bearing rollers are convexly curved in axial section, whereby the peripheral surface of each roller remains in effective bearing contact with said shaft bearing surface irrespective of the angle between the axis of the respective roller and the axis of the shaft.

6. The subject matter of claim 4 wherein: said support comprises a first adjustable part mounting said rollers for movement axially of said shaft, and a second relatively stationary part, and said roller adjusting means comprises means acting between said parts for moving said adjustable part in one axial direction of said shaft, and resiliently compressible means interposed between said parts for yieldably resisting movement of said adjustable part in said one axial direction of the shaft.

7. A roller bearing mount comprising: a support including a pair of end members, a shaft extending between said members and including at each end a conical bearing surface, a set of bearing rollers spaced about and peripherally engaging each shaft bearing surface, means mounting the bearing rollers of one roller set on the adjacent end member of said support for rotation of each roller about an axis, means mounting the rollers of the other roller set on the adjacent end member for rotation of each latter roller about an axis and resilient lateral deflection of each latter roller toward and away from said shaft and, means for relatively adjusting said end members toward and away from one another in the axial direction of said shaft, thereby to preload said bearing rollers.

8. A roller bearing mount comprising: a support including a pair of end members, a shaft extending between said members and including at each end a conical bearing surface, a set of bearing rollers spaced about and peripherally engaging each shaft bearing surface, means mounting the bearing rollers of one roller set on the adjacent end member of said support for rotation of each roller about an axis, means mounting the rollers of the other roller set on the adjacent end member for rotation of each latter roller about an axis and resilient lateral deflection of each latter roller toward and away from said shaft, the peripheral shaft-engaging surfaces of said rollers being convexly curved in axial section, whereby said surface of each roller remains in effective supporting engagement with the respective shaft bearing surface irrespective of the angle between the axis of the respective roller and the axis of the shaft, means for adjusting one of said end members toward the other end member axially of said shaft, and resilient means interposed between said one end member and another portion of said support, whereby said resilient means is compressed upon adjustment of said one end member toward the other end member.

9. The subject matter of claim 8 wherein: said mounting means for each roller of said other roller set comprises a shaft rotatably supporting the respective roller and fitting in a bore in the respective end member, and a resilient bushing about the roller shaft between the latter and the wall of said bore.

10. In combination: a housing including a hollow elongate body and end members at opposite ends of said body, a rotary prime mover within said housing including a shaft extending axially of the housing, means adjustably supporting said prime mover on said housing, said shaft having conical bearing surfaces at its ends adjacent said end members, respectively, a first set of bearing rollers spaced about and peripherally engaging one shaft bearing surface, means mounting said bearing rollers on the adjacent end member for rotation of each roller about an axis, a second set of bearing rollers spaced about and peripherally engaging the other shaft bearing surface, means mounting said latter rollers on the other end member of said housing for rotation of each latter roller about an axis and resilient lateral deflection of each latter roller toward and away from said shaft, means for adjusting said other end member relative to said housing body in the axis direction of said shaft, thereby to adjust said second set of rollers axially relative to the respective conical shaft bearing surface, and a resilient gasket interposed between said housing body and said other end member so as to be compressed by adjustment of the latter end member toward said one end member.

11. The subject matter according to claim 10 wherein: the peripheral shaft engaging surfaces of said rollers are convexly curved in axial section, whereby said surface of each roller remains in effective bearing contact with said shaft irrespective of the angle between the axis of the respective roller and the axis of said shaft, and said mounting means for the rollers of said second roller set comprises a shaft rotatably supporting each latter roller and having a conical shoulder fitting in a conical bore in said other end member, and a resilient conical bushing surrounding each conical shoulder between the latter and the wall of said conical bore.

References Cited by the Examiner

UNITED STATES PATENTS

| | | | |
|---|---|---|---|
| 2,375,098 | 5/1945 | Geczy | 308—190 |
| 2,970,491 | 2/1961 | Bertsch | 308—203 |
| 3,240,137 | 3/1966 | Buck | 308—203 |

FOREIGN PATENTS

| | | |
|---|---|---|
| 1,050,886 | 2/1959 | Germany. |

MARTIN P. SCHWADRON, *Primary Examiner.*

FRANK SUSKO, *Examiner.*